US011212016B1

(12) United States Patent
Kaluzni et al.

(10) Patent No.: US 11,212,016 B1
(45) Date of Patent: Dec. 28, 2021

(54) DISTRIBUTION OF INTER/INTRA CALIBRATION SIGNALS FOR ANTENNA BEAMFORMING SIGNALS

(71) Applicant: XILINX, INC., San Jose, CA (US)

(72) Inventors: Heiko Kaluzni, Grossenhain (DE); Jan Kuhne, Dresden (DE)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/019,040

(22) Filed: Sep. 11, 2020

(51) Int. Cl.
  *H04B 17/11* (2015.01)
  *H04B 17/12* (2015.01)
  *H04B 3/06* (2006.01)
  *H04B 17/14* (2015.01)

(52) U.S. Cl.
  CPC ............... *H04B 17/12* (2015.01); *H04B 3/06* (2013.01); *H04B 17/14* (2015.01)

(58) Field of Classification Search
  CPC .... H04B 17/00; H04B 17/0085; H04B 17/10; H04B 17/102; H04B 17/11; H04B 17/12; H04B 17/14; H04B 17/15; H04B 17/16; H04B 17/17; H04B 17/18; H04B 17/19; H04B 17/20; H04B 17/21; H04B 17/29; H04B 3/06
  See application file for complete search history.

(56) References Cited

U.S. PATENT DOCUMENTS

| | | | |
|---|---|---|---|
| 6,970,496 B1 | 11/2005 | Ben-Bassat et al. | |
| 10,432,327 B2 * | 10/2019 | Wang | H04B 17/21 |
| 10,498,468 B2 * | 12/2019 | Jitsukawa | H04L 5/1461 |
| 10,944,490 B2 * | 3/2021 | Zhu | H04B 17/21 |
| 11,018,782 B2 * | 5/2021 | Jidhage | H04B 17/14 |
| 2010/0309386 A1 | 12/2010 | Pang et al. | |

OTHER PUBLICATIONS

Qorvo Filter QPQ1287 Data Sheet. Retrieved from https://www.qorvo.com, Jun. 21, 2017, 9 pages.
Qorvo Filter TQQ1030 Data Sheet Rev J. Retrieved from https://www.qorvo.com, 11 pages.
"An Adaptable Direct RF-Sampling Solution," White Paper: Direct RF-Sampling Solution, WP489(v1.1), Feb. 20, 2019, 12 pages.

* cited by examiner

*Primary Examiner* — Siu M Lee
(74) *Attorney, Agent, or Firm* — Patterson + Sheridan, LLP

(57) ABSTRACT

An example method of calibrating signals in an antenna array includes generating a calibration signal at a first radio sub unit (RSU), transmitting the calibration signal through a transmission path of a radio front end (RFE) of the first RSU, and receiving the calibration signal in a coupling and distribution layer of the first RSU. The method further includes providing the calibration signal from the coupling and distribution layer of the first RSU directly to a coupling and distribution layer of a second RSU, and processing the calibration signal at the second RSU.

20 Claims, 13 Drawing Sheets

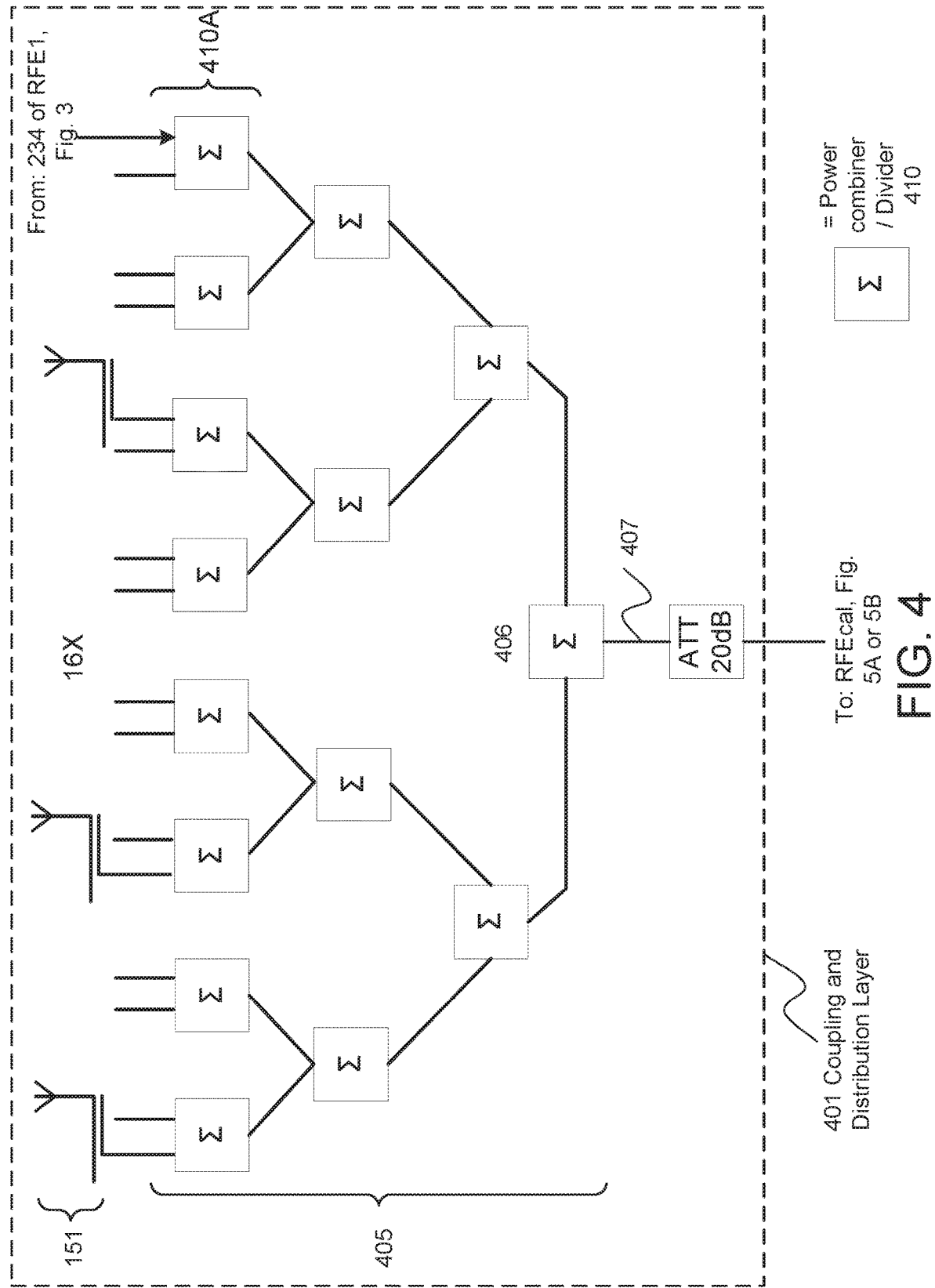

US 11,212,016 B1

DISTRIBUTION OF INTER/INTRA CALIBRATION SIGNALS FOR ANTENNA BEAMFORMING SIGNALS

TECHNICAL FIELD

Examples of the present disclosure generally relate to beamforming antenna systems, and, in particular, to distribution of inter/intra calibration signals for antenna beamforming signals.

BACKGROUND

In a beamforming antenna system, which has multiple antenna ports on each radio sub unit (RSU), calibration of different signals is required. The calibration is based on a comparison between, for example, an amplitude and phase of a reference signal that is sent through, or received via, a plurality of the multiple antenna ports. In order to perform such a comparison, a reference signal needs to be distributed between different parts of the antenna, and also between different sub-antennas or arrays. At each such interface between different parts, there is a transition that the reference signal must pass through. The effort and performance depends on the distribution of this signal.

It is also noted that in signal calibration, it is desirable to simplify the distribution of the reference signal as much as possible. This is because transitions at higher frequencies are not ideally matched. Thus, each transition leads into unwanted mismatch effects and can add complexity to the calibration process. For example, if one has a simple well matched RF line or trace, then the transfer function, or the losses versus frequency, are very flat. Knowing that, one may easily predict intermediate numbers without additional measurement effort. For example, if the loss at 2 GHz is 1 dB, and the loss at 3 GHz is 2 dB, then it may safely be assumed that the loss will be 1.5 dB at 2.5 GHz. In such a case, therefore, it is sufficient to measure just two data points. However, if one is faced with a significantly more complex structure, with mismatches and the like, then the transfer function will show ripple, and depending on one's calibration accuracy many more measurement points are required to obtain a good calibration.

It is also important to avoid transitions for the following reasons. Each transition has unwanted emissions, and those can have influence on other signal paths in the system. It thus requires effort, such as additional shielding, for example, to deal with these emissions, and that means more weight and greater cost. As regards the cost aspect itself, this type of transition requires RF connectors for higher frequencies. RF connectors are more expensive than other types of connectors.

What is thus desired is an improved antenna calibration method that minimizes the number of transitions between RSU sub parts.

SUMMARY

Techniques for calibrating antenna ports in an antenna array are disclosed. In one example, a method is disclosed. The method includes generating a calibration signal at a first radio sub unit (RSU), transmitting the calibration signal through a transmission path of a radio front end (RFE) of the first RSU, and receiving the calibration signal in a coupling and distribution layer of the first RSU. The method further includes providing the calibration signal from the coupling and distribution layer of the first RSU directly to a coupling and distribution layer of a second RSU, and processing the calibration signal on the second RSU.

In some examples the method further includes providing the calibration signal to a calibration module of the second RSU for processing.

In another example, an coupling and distribution apparatus is disclosed. The apparatus includes an antenna array coupled to a first radio sub-unit (RSU), the array including N antenna ports, and one or more layers of power combiners, configured to combine the N antenna ports into a single combined port. The apparatus further includes a single power divider coupled to the single combined port, the power divider configured to divide the single combined port into two output paths, a first signal path coupled to a reference receiver of the first RSU, and a second signal path coupled to a second RSU.

In some examples, the second RSU is adjacent to the first RSU. In some examples, the single power divider is a first power divider, and the apparatus further includes a second power divider coupled to each of an output of the first power divider and a signal path coupled to a third RSU.

In some examples, the calibration signal from the antenna coupling and distribution layer of the first RSU is provided to the antenna coupling and distribution layer of a second RSU over a hardwired connector.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 4 illustrates an example coupling and distribution layer, according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
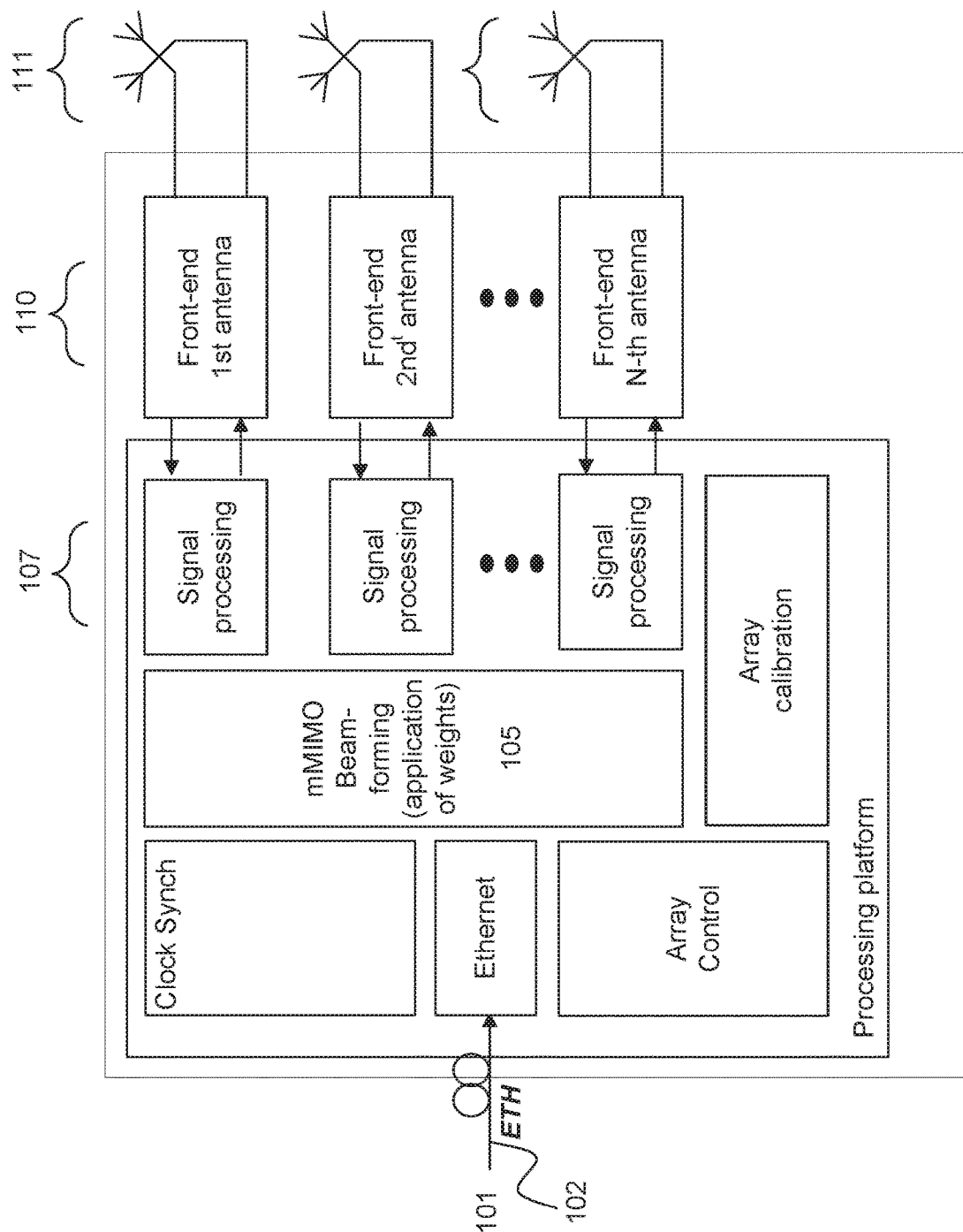
FIG. 1 is a block diagram depicting an example MMIMO radio unit, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

In a beamforming antenna system calibration of different signals is required. The calibration is based on a comparison between, for example, amplitude and phase of a received signal along each of the paths. In order to perform the calibration, the signal is distributed between different parts of the antenna, as well as between different sub-antennas or arrays. The effort and performance depends on the distribution of this signal FIG. 1 is a block diagram depicting an example massive multiple-input multiple-output (MMIMO) radio unit 100, according to an example. It is noted that various examples according to the disclosed invention may utilize any MIMO radio unit, for example. The MMIMO radio unit 100, which is a "massive" MIMO unit has a large array of antennas and also supports beamforming, with better throughput and better spectrum efficiency. With reference thereto, beginning at the far left of the figure, the radio unit 100 receives an incoming signal 101 from a baseband unit (not shown), over, for example, an ethernet connection 102, as shown. The radio unit 100 includes MMIMO beam forming circuitry 105, which provides signals to each of several signal processing circuits 107. In one or more examples, each of the signal processing circuits 107 is connected to a respective one of N front-end circuits 110. A front-end circuit includes both a transmission path and a reception path, and these respective paths are described in greater detail below with reference to FIGS. 3 and 4. In some examples, the number of front-end circuits and corresponding antennas N may be 32, 64, or more. Similarly, each of the N front-end circuits 110 is connected to its own antenna, of N antennas 111, as shown. The N antennas 111 are known collectively as an array of antennas. Each of the N antennas 111 may be separately controlled. As shown by the two arrows connecting each of the signal processing circuits 107 to its respective front-end circuit 110, each front-end circuit may be used for both transmission and reception. It is here noted, as described in detail below, in some examples, when the front-end circuit is used for receiving, the transmitter-path is idle. In one or more examples, the idle transmitter-path may be leveraged to generate a local oscillation signal which may then be utilized in the receiver-path.

Figure 2:
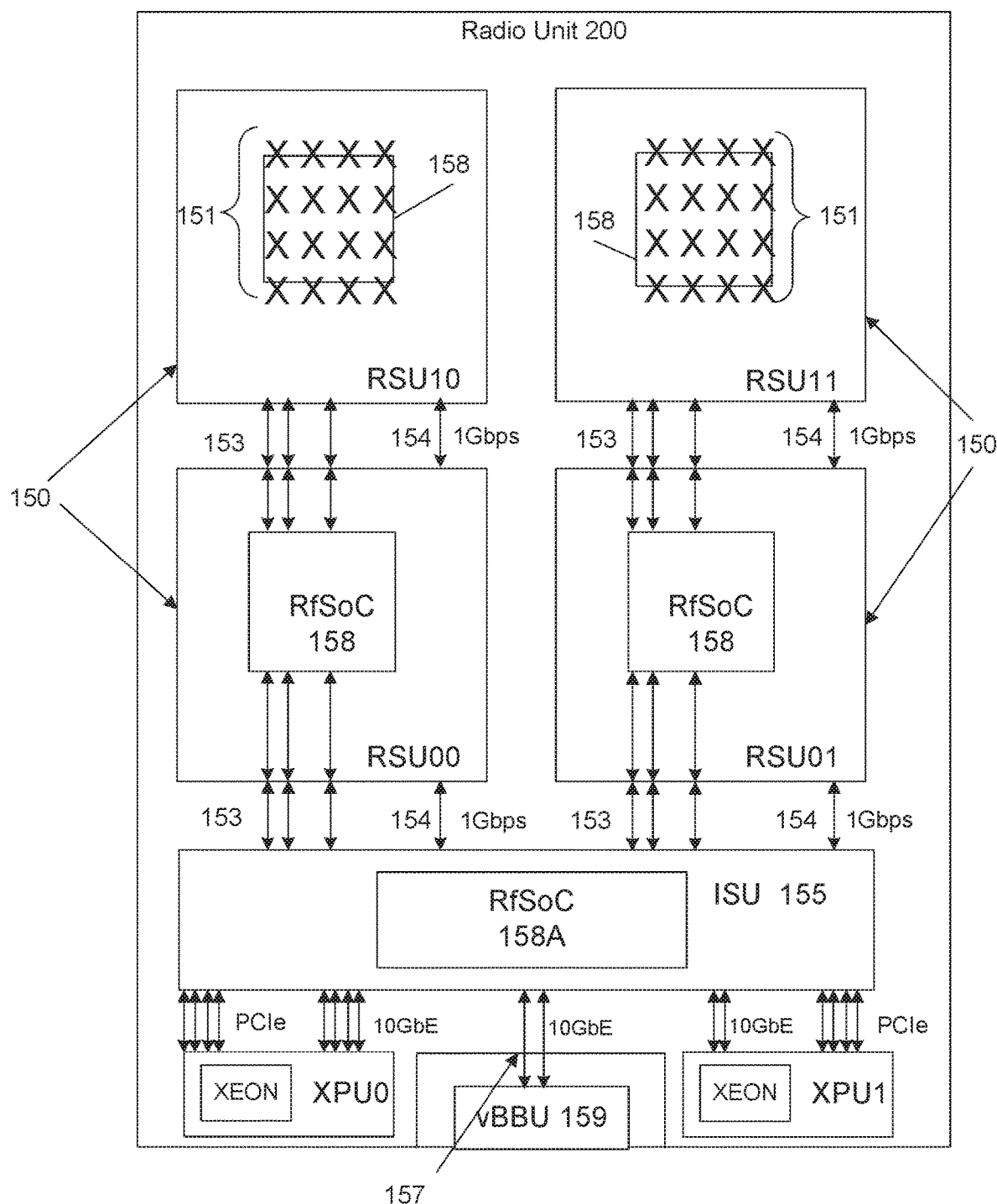
FIG. 2 illustrates an example radio unit architecture, according to an example.

FIG. 2 illustrates an example radio unit architecture 200, according to an example. Thus, FIG. 2 shows how the various functionalities are of the radio unit 200 are divided between radio sub-units 150 ("RSUs"). Each RSU hosts front end, antenna processing, array calibration and control, and clock circuitry. With reference thereto, beginning at the bottom of the figure, there is an interface to a baseband unit ("BBU") 157. In the example of FIG. 2, interface 157 is a 10 gigabit Ethernet (10 GbE) connection, as shown, between interface sub-unit ("ISU") 155 and a virtual baseband unit ("vBBU") 159. Via interface 157, data is either provided to the radio unit 200 during transmission, from the BBU, or, during reception, data is received off of the air via antenna arrays 151, and is provided from the RSUs 150 to the BBU. It is noted that in some examples, transmission and reception for each of the 64 RFEs on the radio unit 200 are time division multiplexed ("TDM"), so that the radio unit 200 is only performing one of these at any given time.

Continuing with reference to FIG. 2, in one or more examples, the ISU 155 is responsible for providing interfaces to the vBBU, the processing units ("XPUs") and the RSUs. It is noted that vBBUs are not located in a base station. Rather, they may be provided in a data center in the cloud. It is further noted that while the resources of a "traditional" BBU are limited, because a vBBU is located in the cloud, one may request more resources, if needed from others. This approach is much more flexible from an architecture point of view, and it is understood by the inventors hereof that implementations using vBBUs will be the next step in 5G communications systems. In alternate examples, however, a more traditional BBU may be used.

Continuing with reference to FIG. 2, ISU 155, as shown, includes a radio frequency system on chip ("RfSoC") 158A, RfSoC 158A processes incoming Ethernet (ETH) data streams, handles distribution of data towards the XPUs and a local PS, handles synchronization of clocks, beamforming, UL processing, inter-RSU-communications, provides interface communication with the other radio units, and manages software updates. The ISU 155 is connected, via data and control connections 153, which in this example include three parallel 25 Gbps links, as shown, to each of four radio sub units ("RSUs") 150. In the example architecture of FIG. 2 these are named, for easy reference, RSU00, RSU01, RSU10 and RSU11, as shown. Moreover, each of the RSUs includes its own RfSoC 158, which may be a high-speed analog to digital converter/digital to analog converter ("ADC/DAC") in some examples, the RfSoCs may be Zynq UltraScale+RFSoCs, as provided by Xilinx, Inc., of San Jose, Calif. In one or more examples, each of the four RfSoCs 158 respectively provides signals to an array of N antennas, which are indicated by an array of "X"s that are shown in the two RSUs at the top of the figure. For ease of viewing, the illustrated "X"s indicating individual antennas are only shown for RSU10 and RSU11, but they are understood to be there for each of RSU00 and RSU01, as well. In the example radio unit architecture of FIG. 2, each RSU has a 4×4 array 151 of antennas, and thus each RfSoC 158 of each RSU 150 controls 16 antennas. In alternate examples, the antenna array 151 in an RSU 150 may be larger, such as an array of 4×8, 8×4, or 8×8 antennas, for example. In each antenna array 151, between each antenna and its respective RfSoC 158 are provided two signal pathways, one for TX and another for RX. Collectively, these two pathways are known as an "RF front-end" that interfaces with an antenna. Details of the RF front-ends are next described with reference to FIG. 3.

Figure 3:
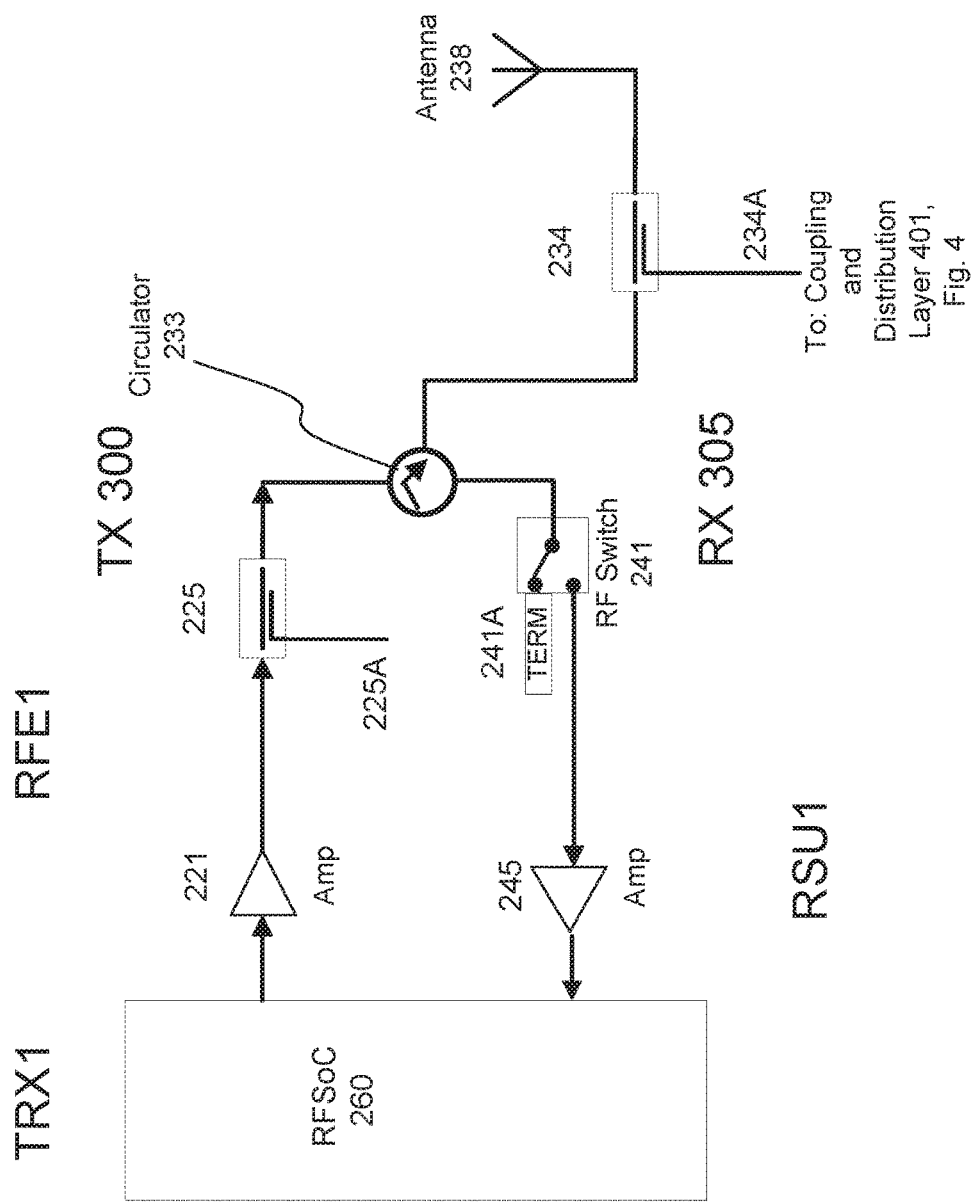
FIG. 3 illustrates an example RF system on chip (RFSoC) and RF front-end, according to an example.

FIG. 3 illustrates an example RF front-end RFE1, that may be connected to each antenna in an antenna array of an RSU, such as, for example, antenna array 111 of FIG. 1, or antenna array 151 of FIG. 2. With reference to FIG. 3, there are shown two signal paths, one on the top, labeled TX 300, and the other on the bottom, labeled RX 305. There is also shown an RFSoC 260 connecting the two signal paths to an antenna 238, which may be one of the 16 antennas in the example array. As shown, there may be sixteen RFEs equivalent to RFE1 in an RSU of a radio unit.

Continuing with reference to FIG. 3, on the TX path, there is an amplifier 221 and a directional coupler 225 connected to the amplifier 221 and also to circulator 233. In one or more examples, coupler 225 is used for various calibration purposes, such as, for example, linearization of amplifier 221. In one or more examples the signal coupled at coupler 225, signal 225A, goes back to an RX ADC during transmission, because during transmission there is no signal being received from the outside, and thus the RX ADC (not shown, but integrated within RFSoC 260) may be used for other purposes. It is noted that coupler 225 only takes a small portion of the signal out of the main signal path as signal 225A. Continuing with reference to FIG. 3, circulator 233 is also connected to coupler 234, and through it, to antenna 238, which thus completes the transmit path. In one or more examples, coupler 234 is used to sample signals, represented as signals 234A, for calibration when in transmit mode, or to inject a calibration signal into a received signal in receive mode.

Continuing still further with reference to FIG. 3, on the RX 305 path, an input signal may be received at antenna 238, and provided to RF switch 241. It is noted that during transmission, RF switch 241 is connected to the "termination" output 241A, so that no incoming signals are processed. In one or more examples, RF switch 241 is for protection of the RX path 305 during transmission. In case the antenna is defective for some reason, and a reflected high signal may come through the circulator 233 directly to the first amplifier 245, connecting to the termination 241A is essential for the function of the circulator. In one or more examples, it may include an RF usable 50 ohm resistor. Thus, it is noted that the circulator 233 is not only used to connect the transmit and receive circuitry to the antenna 238, it is also used to protect the transmit circuitry from signals reflected from the antenna due to mismatch. In order to do so, the termination 241A needs to be there to absorb the reflected signals It is this configuration of RF switch 241 that is illustrated in FIG. 3. However, during reception, RF switch 241 has the other configuration (not shown), where antenna 238 is connected, via RF switch 241, to receiving amplifier 245, which then provides the received signal, as amplified, to RFSoc 260 for decoding and processing. This completes the receive path of RFE1.

Continuing further with reference to FIG. 3, as noted above, there is also depicted a connection 234A to a coupling and distribution layer 401, which is shown in detail in FIG. 4. Coupling and distribution layer 401 is provided between the RFE and the antenna 238, and it obtains sample signals coming from the transmitters in the TX paths of the RSU to be combined at a single connector, and provided to a specialized calibration module of the RSU. The special calibration module includes a calibration RFE as well as calibration processing circuitry. Thus, in one or more examples, during transmission, a sample of each signal is obtained as close to the actual individual antenna element as possible, as shown by coupler 234, and then all of the samples of the RSU, for example, as shown in FIG. 2, sixteen, are combined together. As noted, this is done on the coupling and distribution layer 410 which then needs just one connector back to the calibration frontend. It is here noted that during receiving mode the acquisition and combination of calibration signals works in exactly the other way around.

In one or more examples, using the calibration module, the amplitude and phase of the various signals transmitted from, and received in, the RSU may be measured. In addition, the amplitude and phase transmitted from, and received at, each antenna of the other RSU's antennas may also be measured by the calibration module.

In one or more examples, calibration is implemented as follows. There is an internal calibration signal generator. For transmit, that signal is added onto each normal signal path and transmitted via the frontend. Because the frontends are analog circuits, their respective amplitude/phase responses are different, and it is desired to know that difference. Thus, samples are taken as close to the antennas as possible, fed back into the RSUs RFSOC, and a comparison made to the internal calibration signal generator. That is the so called intra calibration, as it may be performed on each RSU individually. However, there is still a difference between each of the 4 RSUs, especially in absolute phase/time. So that measurement is performed indirectly, in the sense (again for the transmit case example) that the calibration signals that are generated by the adjacent RSU's internal cal signal generator are sampled, fed and compared to the local RSU's cal signal generator. In this manner the four local calibration signal generators are synchronized to each other.

FIG. 4 illustrates an example coupling and distribution layer 401 of an RSU, according to an example. With reference thereto, at the top of the figure there is shown an array 405 of power combiner/dividers 410. The array is used to combine all of the antenna ports of the RSU into one signal path that may be coupled, for example, to a calibration module of the RSU. Each of the power combiner/dividers 410 may act as a splitter that divides an input into two outputs, or it may act as a combiner that combines two inputs into a single output. In the example of FIG. 4, as in FIG. 2, the RSU has 16 antenna ports, shown as antenna array 151. The combiner/divider array 405 has a top layer 410A, which has eight power combiner/dividers, each connected to two antenna ports of antenna array 151, as shown. Each layer below top layer 410A thus has one-half the number of the layer above it, until all of the N antenna ports are combined into a single output 407, at a single combiner/divider 406. The output 407 is then provided to a calibration module of the RSU, as next described with reference to FIGS. 5A and 5B.

Figure 5A:
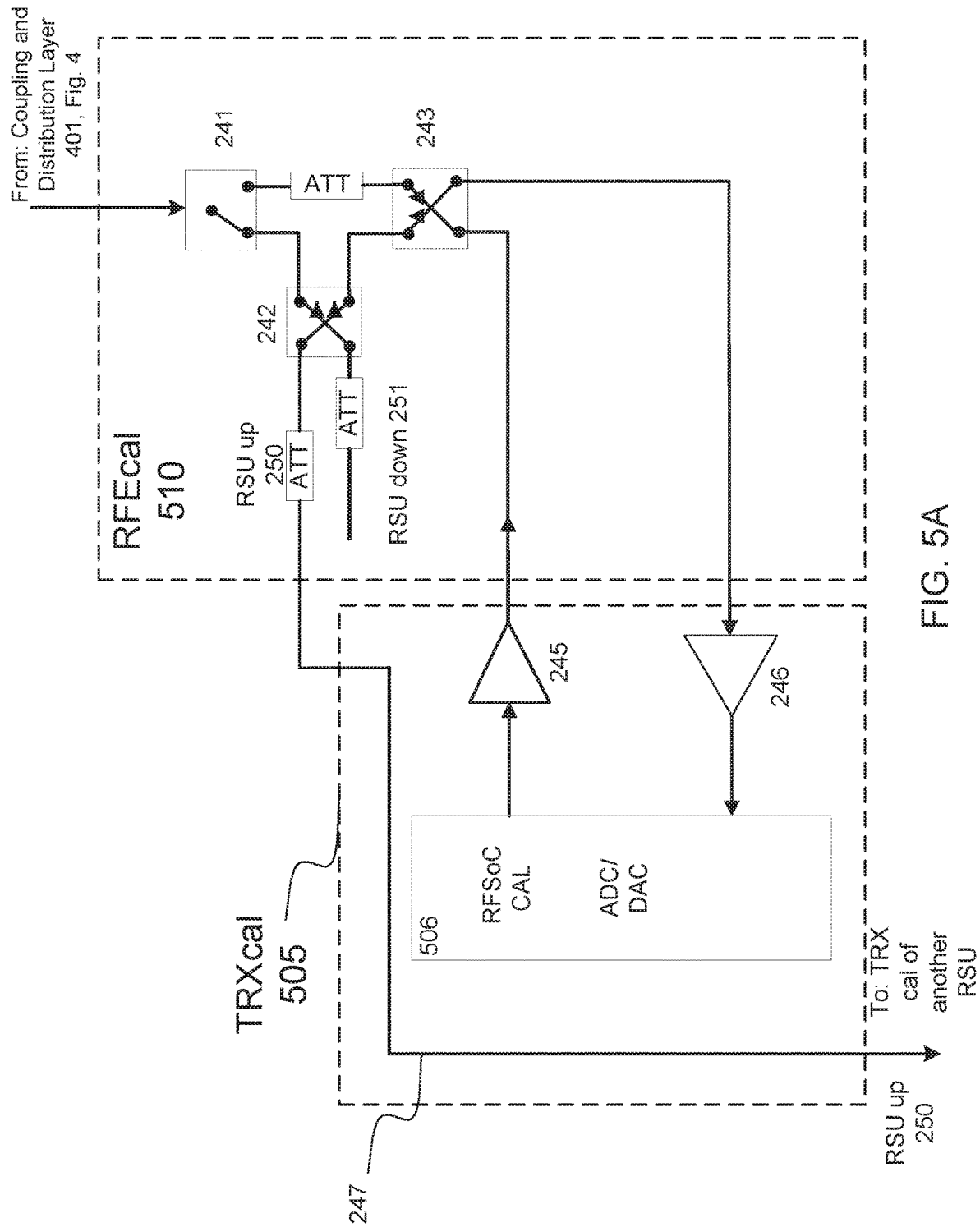
FIG. 5A illustrates an example calibration transceiver and calibration front-end, according to an example.

FIG. 5A illustrates an example calibration module of an RSU, according to an example. The example calibration module has two parts, namely RFEcal 510, which is a radio front end for the module, and a transceiver unit TRXcal 505 which generates calibration signals for transmission, and processes received calibration signals. RFEcal 510 includes RF switches 241, 242 and 243, next described. RFEcal 510 receives a signal from coupling and distribution layer 401, described above with reference to FIG. 4. For example, RFEcal 510 may receive an attenuated version of the signal 407 output by the single bottom combiner/divider 406 of the combiner/divider array 405 of FIG. 4.

Using the calibration RX/ADC, the combined signals gathered during a transmit operation are sampled in order to compare them with the internal digital calibration signal generator in the digital domain. Similarly, in a receive operation, the calibration TX/DAC is used to send the internal calibration signal generators signal towards the couplers that are close to the antennas, and then received and processed using the nominal receive ADC's.

Continuing with reference to FIG. 5A, by means of RF switches 241, 242 and 243, transmission or receipt operation signal may be effected. RF switch 241 interfaces with the antennas of the same RSU, RF switch 243 interfaces with TRXcal 505, and RF switch 242 interfaces with calibration signals coming from, or going to, other RSUs of the radio unit. Thus, for example, a calibration signal may be received from, or sent to, another RSU over signal path 247, which is the "RSU up" output 251 of RF switch 242.

Figure 5B:
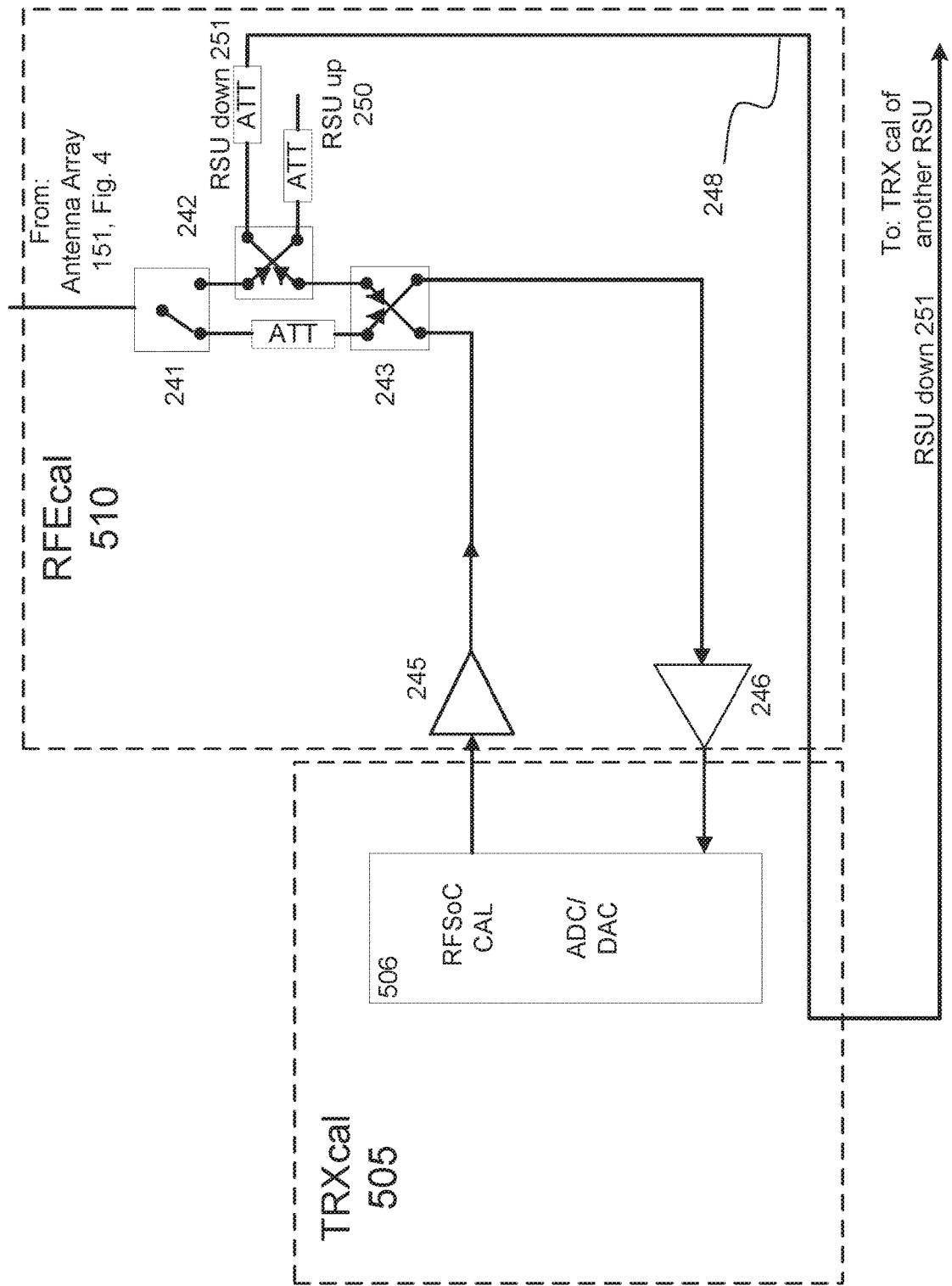
FIG. 5B illustrates an alternate configuration of the calibration transceiver and calibration front-end of FIG. 5A, according to an example.

For transmission, a calibration signal generated in RFSoC CAL 506 of TRXcal 505 may be output through amplifier 245, and for reception, a calibration signal may be received through amplifier 246. In one or more examples, the transmitted calibration signals may be sent to antennas of the same RSU, and thus switched through RF switch 241, or to antennas of any other RSU of the radio unit, and thus switched through RF switch 242. In one or more examples, RSU up 250, and RSU down 251, are used to connect the local distribution layer to adjacent RSU's. This is needed for synchronization of the RSU's amongst each other FIG. 5B illustrates an alternate calibration module, according to an example. The calibration module of FIG. 5B is the same as that shown in FIG. 5A, with the exception that the outputs of RF switch 242 are oriented away from TRXcal 505. Additionally, in the example of FIG. 5B, the signal path 248 to the TRXcal of a different RSU is the "RSU down" output 251 of RF switch 242.

Figure 6:
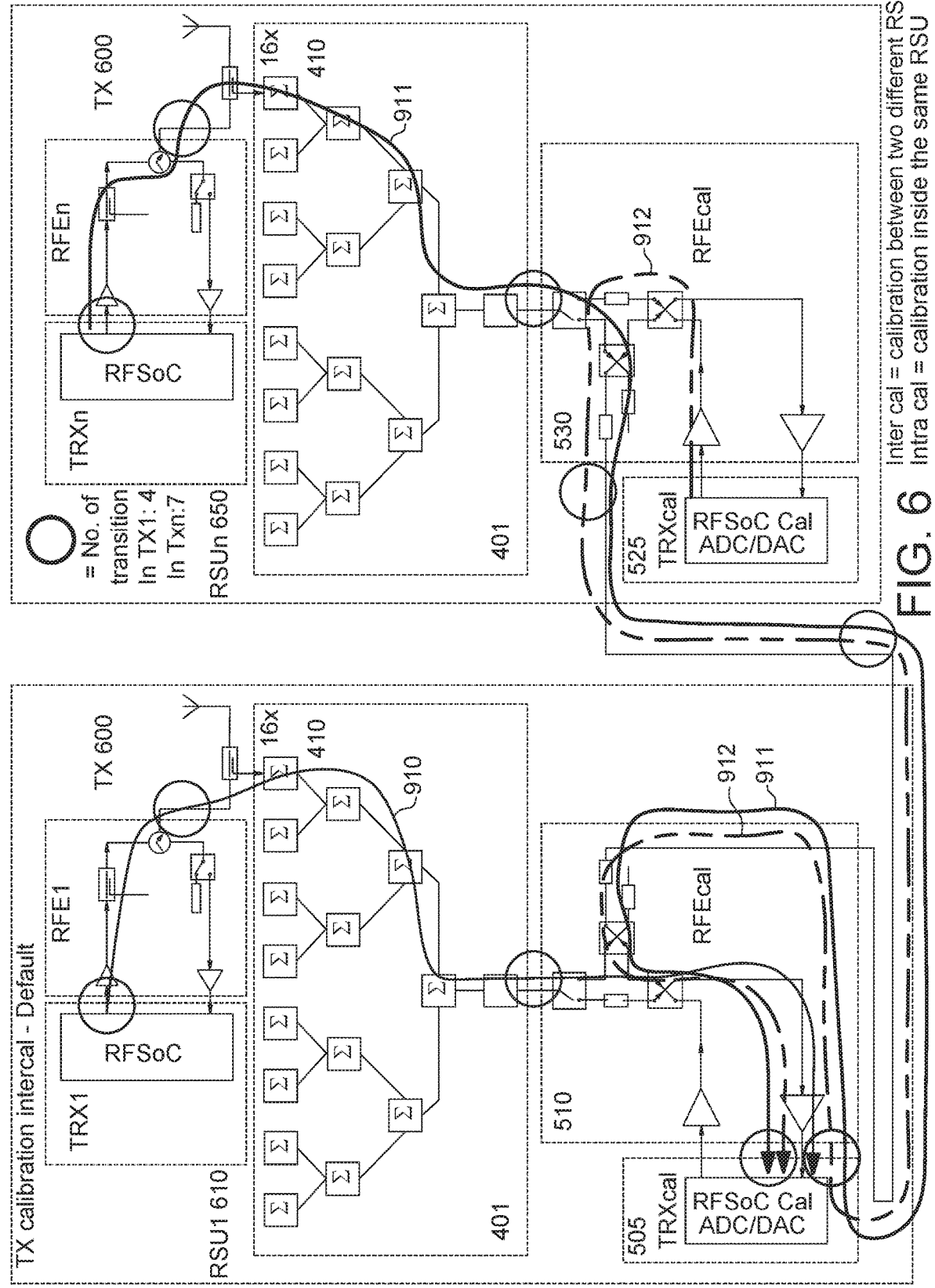
FIG. 6 illustrates a comparison of a conventional transmission calibration path within one RSU ("intra cal") and between two separate RSUs ("inter cal"), according to an example.
Figure 7:
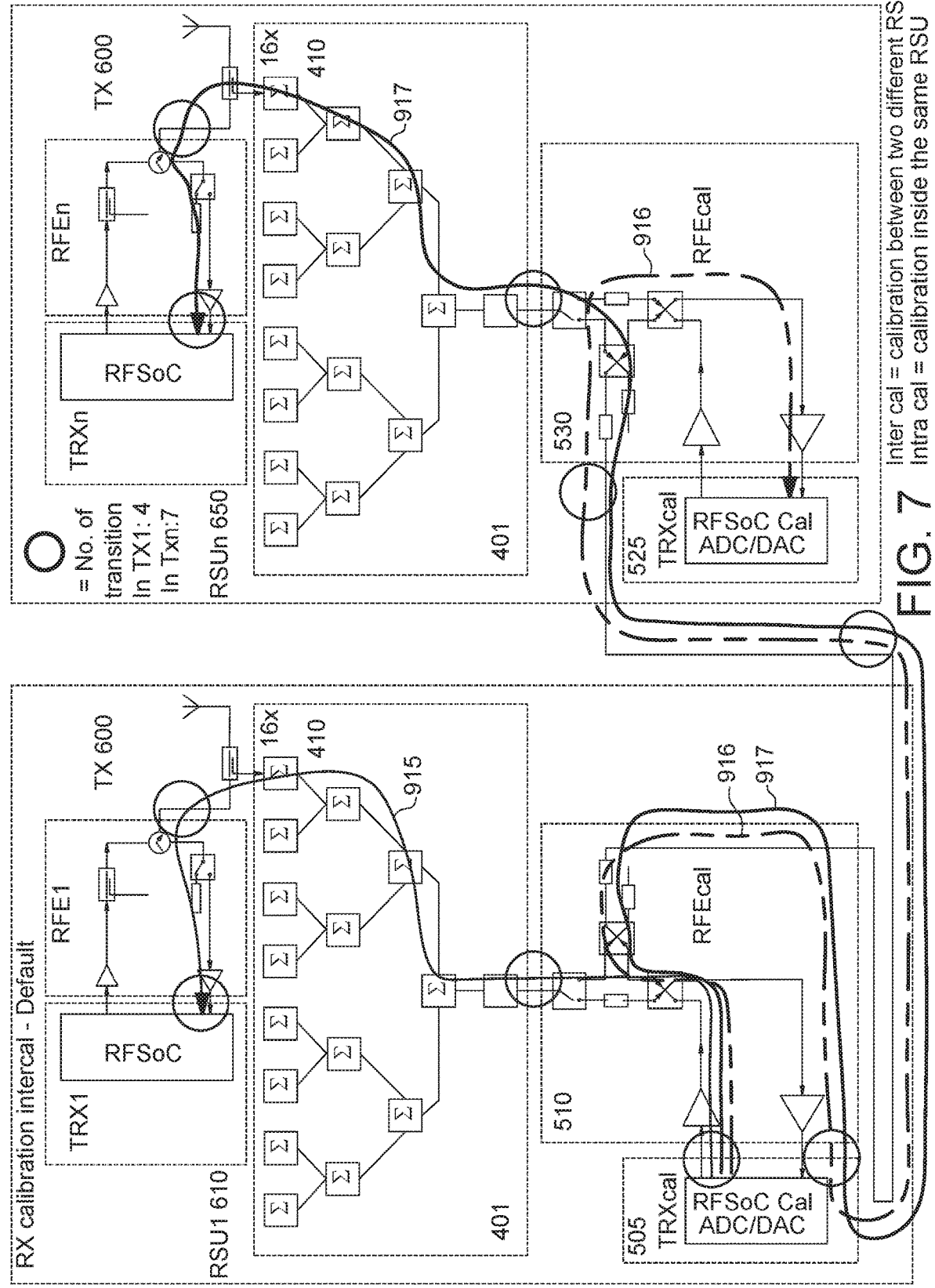
FIG. 7 illustrates comparison of a conventional reception calibration path within one RSU ("intra cal") and between two separate RSUs ("inter cal"), according to an example.

FIGS. 6 and 7 illustrate conventional calibration paths, for both "intra cal", or calibration within one RSU, or "inter cal" for calibration between two different RSUs. These are next described. It is noted that conventional calibration paths tend to have a high number of transitions, which, as noted above, is problematic. With reference to FIG. 6, two RSUs are depicted. RSU1 on the left side of the figure, and RSUn on the right side of FIG. 6. It is noted that in each of FIGS. 6 and 7, and also in each FIGS. 9 and 10, the same two RSUs are illustrated, an RSU1 on the left and an RSUn on the right. Each RSU includes, shown at the top of the various figures, one example TRX and an associated RFE, such as is shown in FIG. 3, and described above. In actuality there is a separate TRX and RFE for each antenna port in the array, which is 16 antenna ports. Thus there is shown in each of these figures an example TRX1 and RFE1 for RSU1, and an example TRXn and RFEn for the RSUn of each figure, but, as noted, these are each for only one antenna port of the 16, the remaining 15 TRXs and RFEs not being shown for ease of description. Each RSU also includes a calibration module, including a TRXcal and an RFEcal, shown at the bottom of each RSU, such as is shown in detail in FIGS. 5A and 5B, respectively, and also described above. Because the view of FIGS. 6 and 7, and of FIGS. 9 and 10, includes both the TRX and RFE of each RSU, as well as its TRXcal and its RFEcal, and thus each of their sizes is smaller, these modules were presented above in detail in FIGS. 3, 5A and 5B, respectively. Each RSU depicted in FIGS. 6 and 7, and in FIGS. 9 and 10 also includes a coupling and distribution layer 401, which is equivalent to the coupling and distribution layer 401 illustrated in FIG. 4 and described above in detail. Thus, each of FIGS. 6 and 7, and FIGS. 9 and 10, illustrate various example calibration signal paths, of both types, being intra cal within a single RSU, and inter cal between two adjacent RSUs.

Continuing with reference to FIG. 6, beginning with RSU1, at the top left of the figure an intra cal signal 910 is generated at transceiver TRX1, associated with a first antenna. The intra cal signal 910 is passed to a radio front end RFE1 connected to TRX1, and from RFE1 the intra cal signal 910 is sent through the first antenna, and, via power combiner/divider 410, it enters coupling and distribution layer 405. From coupling and distribution layer 405 the intra cal signal 910 is provided to RFEcal 510, and finally to TRXcal 505. As shown by the black circles superimposed on intra cal signal 910, there are four transitions from generation at TRX1 to receipt at TRXcal of RSU1. These include a transition from TRX1 to RFE1, another from RFE1 to coupling and distribution layer 405, a third from coupling and distribution layer 405 to RFEcal 510, and finally, a fourth transition from RFEcal 510 to TRXcal 505, where the signal is processed.

Continuing with reference to FIG. 6, an inter cal signal 911 is next described. The inter cal signal 910 begins at the top left of FIG. 6 in a transceiver TRXn of RSUn. As noted above, the inter cal signal 910 begins on one RSU, RSUn, but ends on a different RSU, RSU1, which allows calibration between different RSUs. Beginning at the top of the figure inter cal signal 911 is generated at transceiver TRXn, associated with a first antenna. The inter cal signal 911 is passed to a radio front end RFEn connected to TRXn, and from RFEn the inter cal signal 911 is sent through a first antenna, and, via power combiner/divider 410, enters coupling and distribution layer 405. From coupling and distribution layer 405 the inter cal signal 911 is provided to RFEcal 530 of RSUn, and finally to TRXcal 525 of RSUn. As shown by the black circles superimposed on inter cal signal 911, there are four transitions from generation at TRXn to receipt at TRXcal 525 of RSUn.

However, the inter cal signal 911 does not terminate at TRXcal 525 of RSUn. Rather, instead of being processed by the RFSOC of TRXcal 525, it is provided by TRXcal 525 over a direct connection (as opposed to over an RF channel) to TRXcal 505 of RSU1. This direct connection is the same as signal path 247 of FIG. 5a, also referred to as the "RSU up 250" path. It is here noted that TRXcal 525 and RFEcal 530 of RSUn of FIGS. 6 and 7 have the same respective configurations as do TRXcal 505 and RFEcal 510 of FIG. 5A, and TRXcal 505 and RFEcal 510 of RSU1 of FIGS. 6 and 7 each have the same respective configurations as do TRXcal 505 and RFEcal 510, as shown in FIG. 5B. Therefore, in what follows, certain details of the TRXcal and RFEcal of RSUs 1 and n may be described with their equivalent versions shown in FIGS. 5A and 5B.

Continuing with reference to FIG. 6, the inter cal signal 911, upon being received at RFEcal 510 of RSU1, passes through RF switches 242 and 243 (as shown in FIG. 5B), is amplified at amplifier 246, and is then processed in RFSOC 506 of TRXcal 505. This portion of the signal path adds an additional 3 transitions, namely a fifth upon exiting TRXcal 525 of RSUn, a sixth upon entering RFEcal 510 of RSU1, and a seventh upon exiting RFEcal 510 to TRXcal 505 of RSU1, where it is processed. The inter cal signals provide a common reference to align the calibration TRX's on different RSU's.

Continuing further with reference to FIG. 6, there is also shown a third signal, which is a second inter cal signal 912, that is generated in RSUn 650, but instead of being generated in the TRXn of RSUn 650, it is instead generated in the common calibration module TRXcal 525 of RSUn 650 This signal 912 is also used to calibrate/adjust more than two RSUs to a single reference.

FIG. 7 illustrates a comparison of a conventional reception calibration path within one RSU ("intra cal"), as shown in the left side of the figure, and between two separate RSUs ("inter cal"), as shown starting on the left, and ending on the right, sides of the figure, according to an example. In contrast to the comparison shown in FIG. 6, in the examples of FIG. 7, the calibration signals are all generated in the calibration module of RSU1 610, in its TRXcal 505, and are similarly received in the RFE coupled to one antenna of an RSU's antenna array. Thus, with reference to FIG. 7, beginning in RSU1 610 on the left side of the figure, an intra cal calibration signal 915 is generated in TRXcal 505, propagated through RFEcal 510, and from RFEcal 510 provided to coupling and distribution layer 401 of RSU1 610, including to its top layer, and to combiner/divider 410, which is coupled to the antenna of RFE1, which is one of 16 RFEs of RSU1. Once received in RFE1 the intra cal signal 915 is provided, along the RX path 605 of the RFE, to the transceiver TRX1 and then processed. As was seen in the analogous intra cal signal 910 of FIG. 6, this signal goes through four transitions.

Similarly, also beginning in RSU1 on the left side of the figure, inter cal calibration signals 916 and 917 are also generated in TRXcal 505, propagated through RFEcal 510, and in this example, from RFEcal 510 provided back to TRXcal 505, for transmission via TRX to TRXcal 525 of RSUn 650. In alternate embodiments signals 916 and 917 may be provided directly from RFE cal 510 to TRX cal 525 of RSUn 650 From TRXcal 525 these signal are each are provided to RFEcal 530 of RSUn 650. As shown, signal 916 is then provided again to TRXcal 525 and processed, but inter cal signal 917 is sent, via RF switches 242 and 241 of RFEcal 530, as shown in FIG. 5B and described above, from RFEcal 530 to coupling and distribution layer 401 of RSUn 650, including to its top layer, and to combiner/divider 410, which is coupled to the antenna of RFEn, which is one of 16 RFEs of RSUn. Once received in RFEn the inter cal signal 917 is provided along the receive path RX 605 to TRXn of RSUn 650 and then processed in the RFSoC of RSUn 650.

Figure 9:
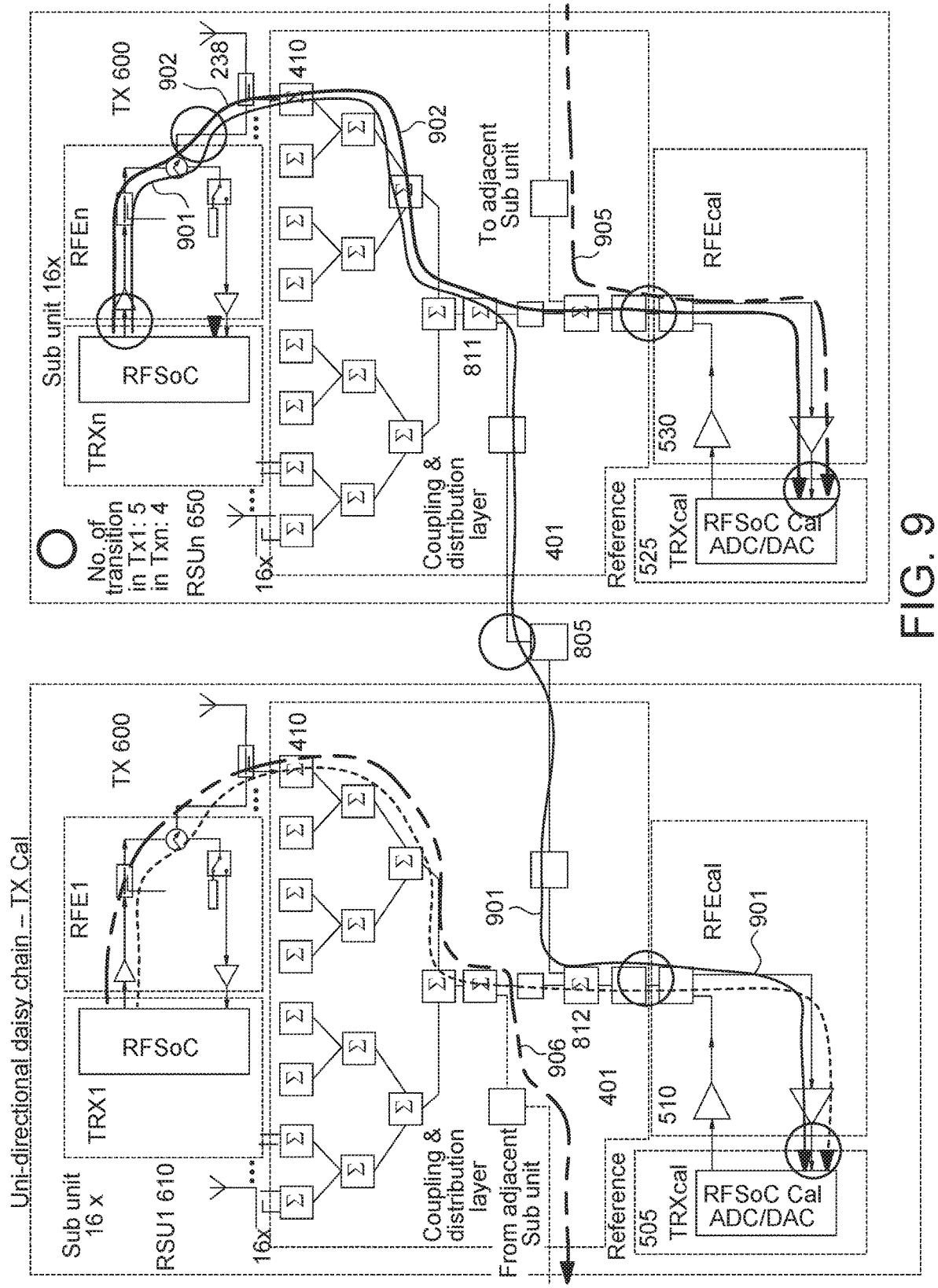
FIG. 9 illustrates an example uni-directional daisy chain transmission calibration path, according to an example.
Figure 10:
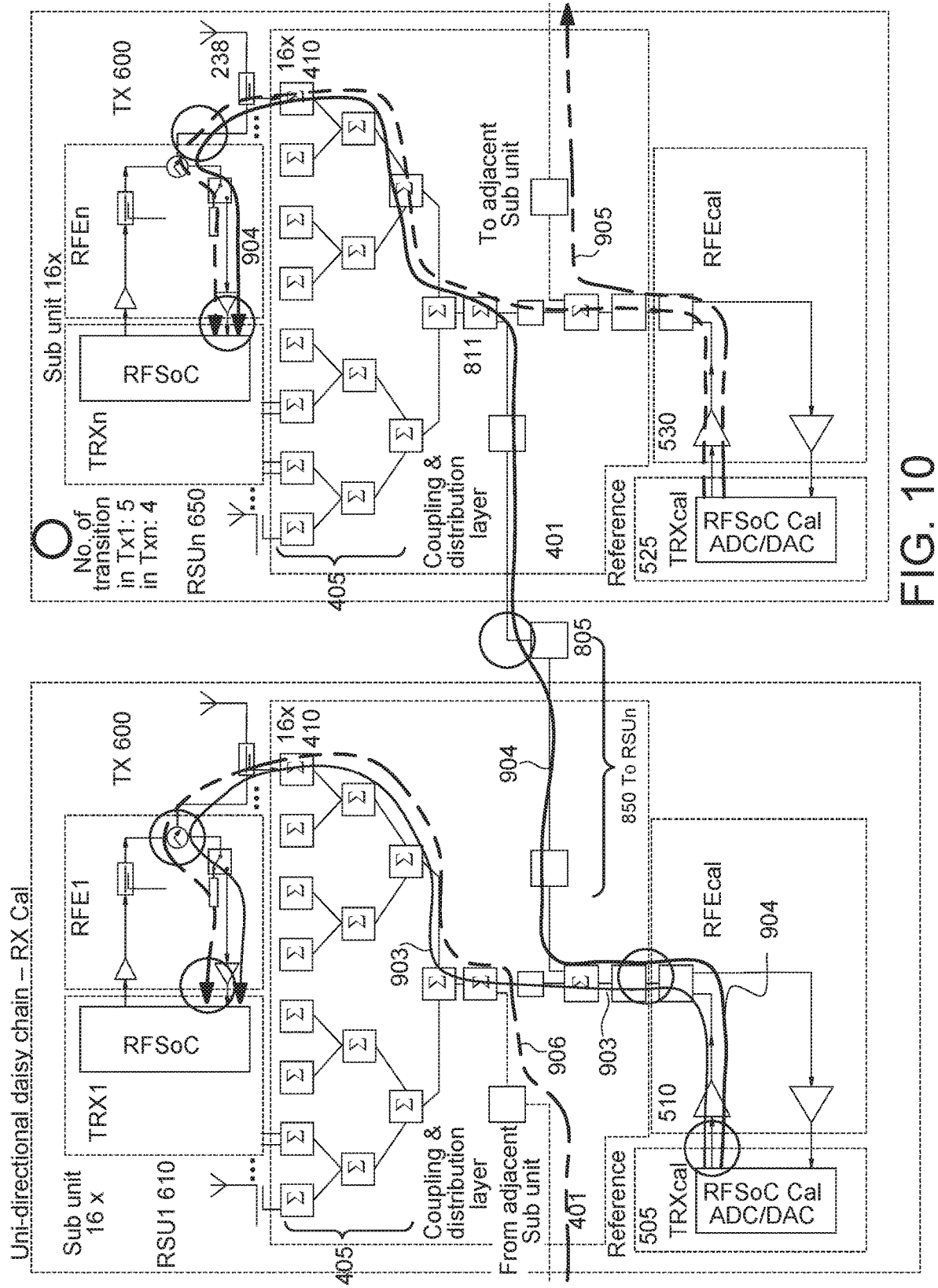
FIG. 10 illustrates an example uni-directional daisy chain reception calibration path, according to an example.

As shown in FIG. 7, at the top left of the right panel, just as was the case for the TX calibration of FIG. 6, the intra cal signal 915 goes through four transitions, and the inter cal signal 917 goes through seven transitions. As noted above, the greater the number of transitions, the more likely isolation problems will occur. Therefore, in accordance with one or more examples, the large number of conventional inter calibration transitions may be reduced using a direct connector between respective coupling and distribution layers of two RSUs so as to bypass a calibration module of one of the RSUs. In transmission calibration, as illustrated in FIG. 9, the direct connector connects the remote (originating) RSU with an adjacent (receiving) RSU, at the coupling and distribution layer level, without the need for the calibration signal to first pass through the TRXcal and RFEcal of the remote RSU, e.g., RSUn. In reception calibration, as illustrated in FIG. 10, the direct connector connects the remote (receiving) RSUn with an adjacent (originating) RSU1, at the coupling and distribution layer level, without the need for the calibration signal to first pass through the TRXcal and RFEcal of the remote RSUn.

Figure 8A:
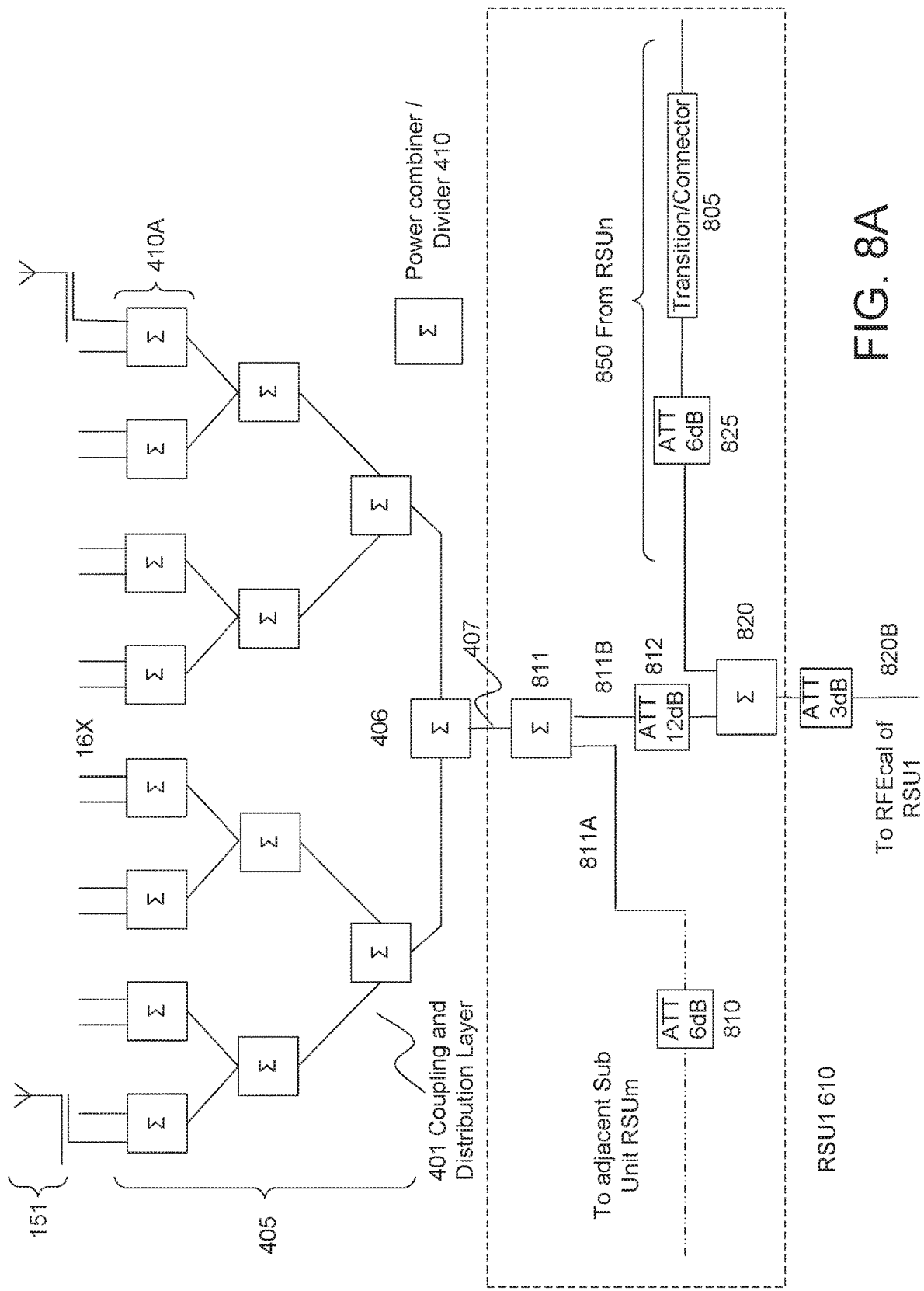
FIG. 8A illustrates an example coupling and distribution layer at a first RSU, according to an example.
Figure 8B:
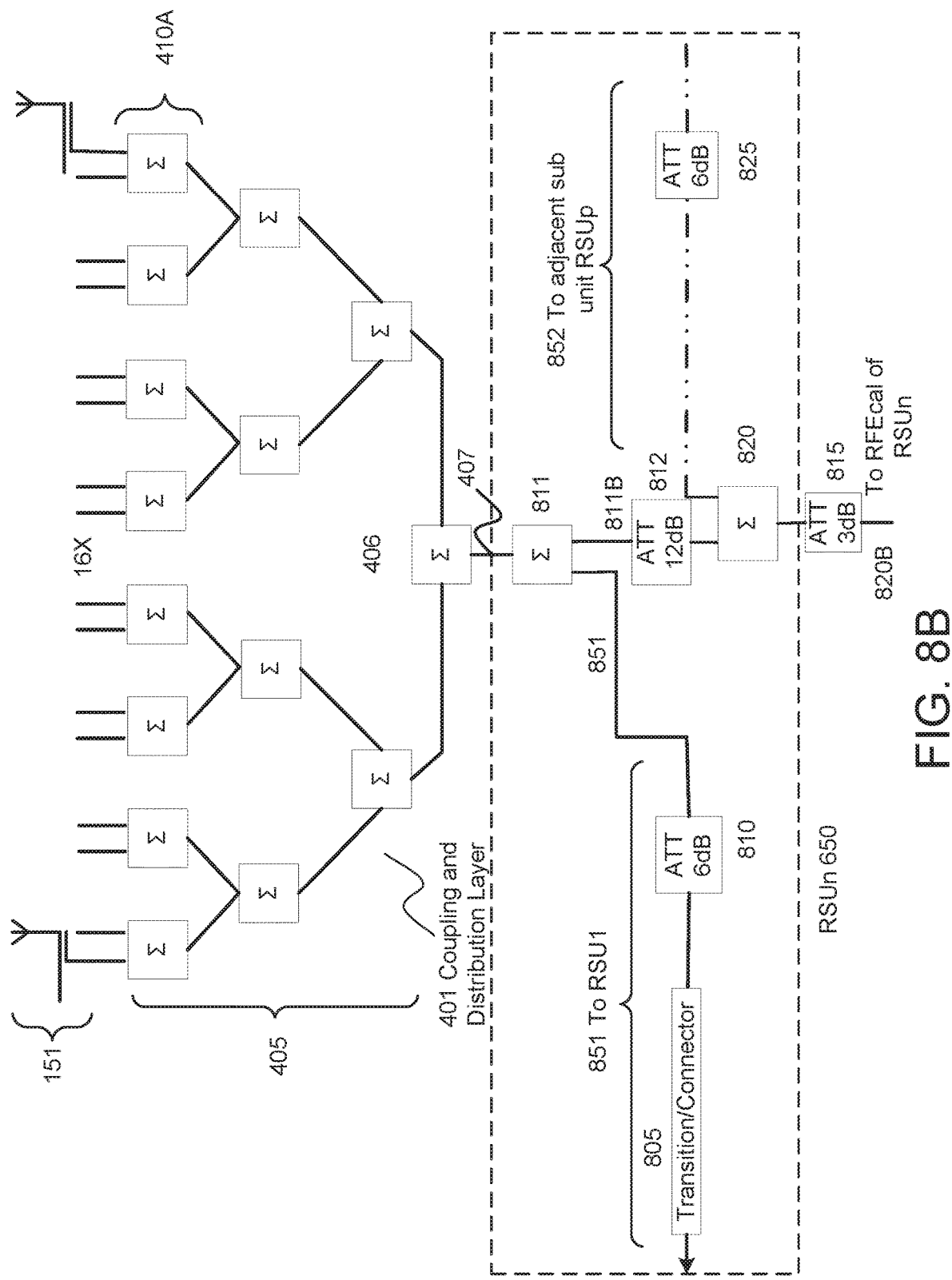
FIG. 8B illustrates an example coupling and distribution layer at an Nth RSU, according to an example.

FIGS. 8A and 8B, next described, illustrate example additions to the coupling and distribution layer 401 that facilitate bypassing the calibration module of the remote RSU in an inter cal calibration, either a TX or an RX calibration. By bypassing the remote RSU's calibration module completely in the inter cal signal path, the number of transitions is reduced. It is noted that by "remote RSU" what is intended is the originating RSU in a TX inter cal RX calibration (e.g., as shown in FIG. 9), and the receiving RSU in an RX inter cal calibration (e.g., as shown in FIG. 10).

FIG. 8A illustrates an example coupling and distribution layer at a first RSU, RSU1 610 of a radio unit, according to an example. The elements within the dashed box indicate additions to the coupling and distribution layer according to one or more embodiments, and thus, by comparison, they are not shown in the example conventional circuit of FIG. 4. These additional elements shown in the example of FIGS. 8A and 8B allow a calibration signal to be directly transmitted from a first coupling and distribution layer at a first RSU to a second coupling and distribution layer at a second RSU. With reference to FIG. 8A, the signal path 407 that is output from the bottom of single combiner/divider 406, is input to an additional combiner/divider 811 that splits the signal path into two paths. A first path 811A runs through attenuator 810 that connects to a first adjacent RSU, RSUm, and a second path 811B that runs through attenuator 812, and through a second combiner/divider 820 that combines the second path with a signal path 850 connected to the coupling and distribution layer of a second adjacent RSU, RSUn 650, for example, through, for example, transition/connector 805. The combined path 820B is then input to the a reference receiver of RFEcal of RSU1.

Similarly, FIG. 8B illustrates an example coupling and distribution layer at an nth RSU, RSUn 650, according to an example. The elements within the dashed box indicate additions to the coupling and distribution layer 401 according to one or more embodiments, and it is these additional elements that allow the calibration signal to be directly transmitted from, for example, the coupling and distribution layer 401 of RSUn 650 to the coupling and distribution layer at RSU1 610, shown in FIG. 8A.

With reference to FIG. 8B, in analogous fashion to that as described with reference to FIG. 8A, regarding RSU1 610, the signal path 407 that is output from the bottom single combiner/divider 406 is input to an additional combiner/divider 811 that splits the signal path into two paths. A first path 851 that runs through attenuator 810 and transition/connector 805 that connects to RSU1, for example, and a second path 811B that runs through attenuator 812, and then through a second combiner/divider 820 that combines the second path 811B with a signal path 852 that is connected to the coupling and distribution layer of an adjacent sub unit RSUp, also for example, through a corresponding transition/connector 805 (not shown). The combined path 820B is then input to the a reference receiver of RFEcal of RSUn.

Thus, as illustrated in FIGS. 8A and 8B, it is the direct pathways at each RSU to any adjacent RSUs (generally two of them) that allow for the direct transmission of the calibration signals between remote RSUs and thus to bypass the RFEcal of the adjacent (remote) RSU. In one or more examples, the transition/connector is hardwired connector, and may comprise a coaxial RF connector. In some examples, where a connection between adjacent RSUs is short, the hardwired connector may comprise an adapter or a board to board connector.

FIGS. 9 and 10 illustrate TX and RX calibration examples according to one or more examples. Thus, FIGS. 9 and 10 illustrate RSUs 1 and n as shown in FIGS. 6 and 7, respectively, however now as augmented with the additions to the coupling and distribution layers as illustrated in each of FIGS. 8A and 8B, so that calibration signals may be directly transmitted between the coupling and distribution layers of two remote RSUs, according to an example, thereby bypassing the RFEcal of the remote or adjacent RSU. FIGS. 9 and 10 are next described.

FIG. 9 illustrates an example uni-directional daisy chain transmission calibration path for a TX calibration, according to an example. Thus, in the example of FIG. 9 each RSU generates calibration signals in TX paths of its RFEs, routes them through its coupling and distribution layer, and sends a combined TX calibration signal to both its own and an adjacent (in FIG. 9, adjacent to the left) RSU's coupling and distribution layer, from which it is processed in a calibration module of each receiving RSU. Thus, FIG. 9 illustrates inter cal signal 901 and intra cal signal 902, both generated in a remote RSU, RSUn 650. The inter cal signal 901 is ultimately received at a reference module on RSU1. With reference to the top right portion of FIG. 9, inter cal signal 901 is generated in TRXn which is 1 of 16 transceivers in RSUn, as shown. Inter cal signal 901 is provided by TRXn to RFEn which constitutes its first transition. From RFEn the calibration signal 901 is provided to an antenna associated with RFEn and thereby enters coupling and distribution layer 401 which is its second transition. Within the coupling and distribution layer 401 the signal 901 is propagated downwards through the various layers until it reaches the first additional combiner/divider 811. In one or more examples, at combiner/divider 811 a number of calibration signals, for example one for each antenna port of RSUn 650, may be combined into one combined calibration signal 901, for sending to the adjacent RSU RSU1 610. In general, in one or more examples, calibration signals from all antenna ports of an RSU may be combined, or alternatively just one or more may be used. The calibration signal 901 then follows the path out of the first additional combiner/divider 811 that runs towards RSU1, as shown, through for example, transition/connector 805, which constitutes the signal's third transition. Once inside coupling and distribution layer 401 of RSU1, the inter cal signal 901 is provided to one input of the second additional combiner/divider 812, through which it is provided, through an attenuator, to RFEcal 510, making its fourth transition. Finally, the calibration signal 901 is provided by RFEcal 510 to TRXcal 505, and then processed. The transition from RFEcal 510 to TRXcal 505 is the signal's fifth and last transition. As noted above, the calibration signal is processed to measure amplitude and phase for each component (e.g., from each RFE's) signal.

A comparison of FIG. 9 with previous FIG. 6 shows that while the number of transitions for the intra cal signal 902 in FIG. 9 has not changed from the conventional system shown in FIG. 6, the inter cal signal 901 now has two less transitions, which is a significant improvement. Similar results are seen for a reception calibration signal, as shown in FIG. 10, next described.

The dashed or phantom signal 906 of FIG. 9 illustrates an equivalent inter cal signal path as was just described for signal 901, except that signal 906 is generated in RSU1, at TRX1, and is received at an adjacent RSU (not shown) to the left of RSU1 in FIG. 9.

FIG. 10 illustrates the example two RSUs that are shown in FIG. 9, with a uni-directional daisy chain reception calibration path, according to an example. Thus, in the example of FIG. 10 each RSU generates calibration signals in TX paths of its RFEcal, routes them through its coupling and distribution layer, and sends a combined RX calibration signal to both its own and an adjacent (in FIG. 10, adjacent to the right) RSU's coupling and distribution layer, from which it is received in an RFE's RX path of each receiving RSU. With reference to the bottom left of FIG. 10, in the TRXcal 505 of RSU1, two calibration signals are generated, intra cal signal 903, and inter cal signal 904. The inter cal signal 904 is ultimately received at a transceiver of RSUn, being TRXn as shown at the top of the right panel of FIG. 10. Because the techniques according to this disclosure target inter cal signals, the path of inter cal signal 904 is primarily described. It is noted that in this example of FIG. 10 each of intra cal signal 903 and inter cal signal 904, after being generated in the TRXcal of RSU1 610, are split into 16 parts at divider 811 and then respectively fed through each RFE's RX path. In contrast, in the example of FIG. 9, for the other direction, where the calibration signals respectively originate in multiple TRXs of the RSUn, multiple different calibration signals are used, and each TRX/RFE has its own calibration signal. This is because it is necessary to separate the signals later, in a common RX cal receiver (e.g., TRXcal 505 of RSU1), so that it can be known where the signal was coming from. However, the calibration signals in the TX calibration case are hidden and part of the wanted transmit signal, but their level is much less than that of the wanted signal. The calibration signals are then reobtained by using a correlation algorithm.

Continuing with reference to FIG. 10, after being generated at TRXcal of the calibration module 505 of RSU1 610, inter cal signal 904 is provided by TRXcal 505 to the calibration module's RFE, RFEcal 510 which constitutes its first transition. From RFEcal 510 the calibration signal 904 is provided to RSU1's coupling and distribution layer 401, which is its second transition, as indicated on the signal 904 at the interface between RFEcal 510 and RSU1's coupling and distribution layer 401. Within the coupling and distribution layer 401 the signal 904 is not sent through the various layers 405, but rather, after being sent through power combiner/divider 812, it is sent down the right side signal path 850 in a direct transmission to RSUn, and thus passes through, for example, transition/connector 805, which constitutes the signal's third transition. After passing through transition/connector 805, the inter cal signal 904, now in the coupling and distribution layer 401 of RSUn, is propagated upwards through the first additional combiner/divider 811, and on through the various layers along the rightmost path of the combiner/divider array, as shown, until it reaches the upper rightmost combiner/divider 410. Combiner/divider 410 outputs to two antenna ports, the rightmost of which is an antenna coupled to RFEn at the top of RSUn, as shown, which constitutes its fourth transition. The inter cal signal 904 is then provided by RFEn to TRXn, which constitutes its fifth and final transition, and the inter cal signal 904 is then processed at TRXn of RSUn. Because inter cal signal 904 split into 16 parts at divider 811 of RSUn 650, a similar signal is received at each RFE of RSUn, so as to calibrate the entire set of antenna ports.

A comparison of FIG. 10 with previous FIG. 7 also shows that while the number of transitions for the intra cal signal 903 has not changed from that of the conventional system shown in FIG. 7, the inter cal signal 904 of FIG. 10, due to the direct transmission of the calibration signals between remote RSUs over a direct path through connector 805, the signal 904 now has two less transitions in its path from TRXcal 505 to TRXn of RSUn, which is a significant improvement.

Figure 11:
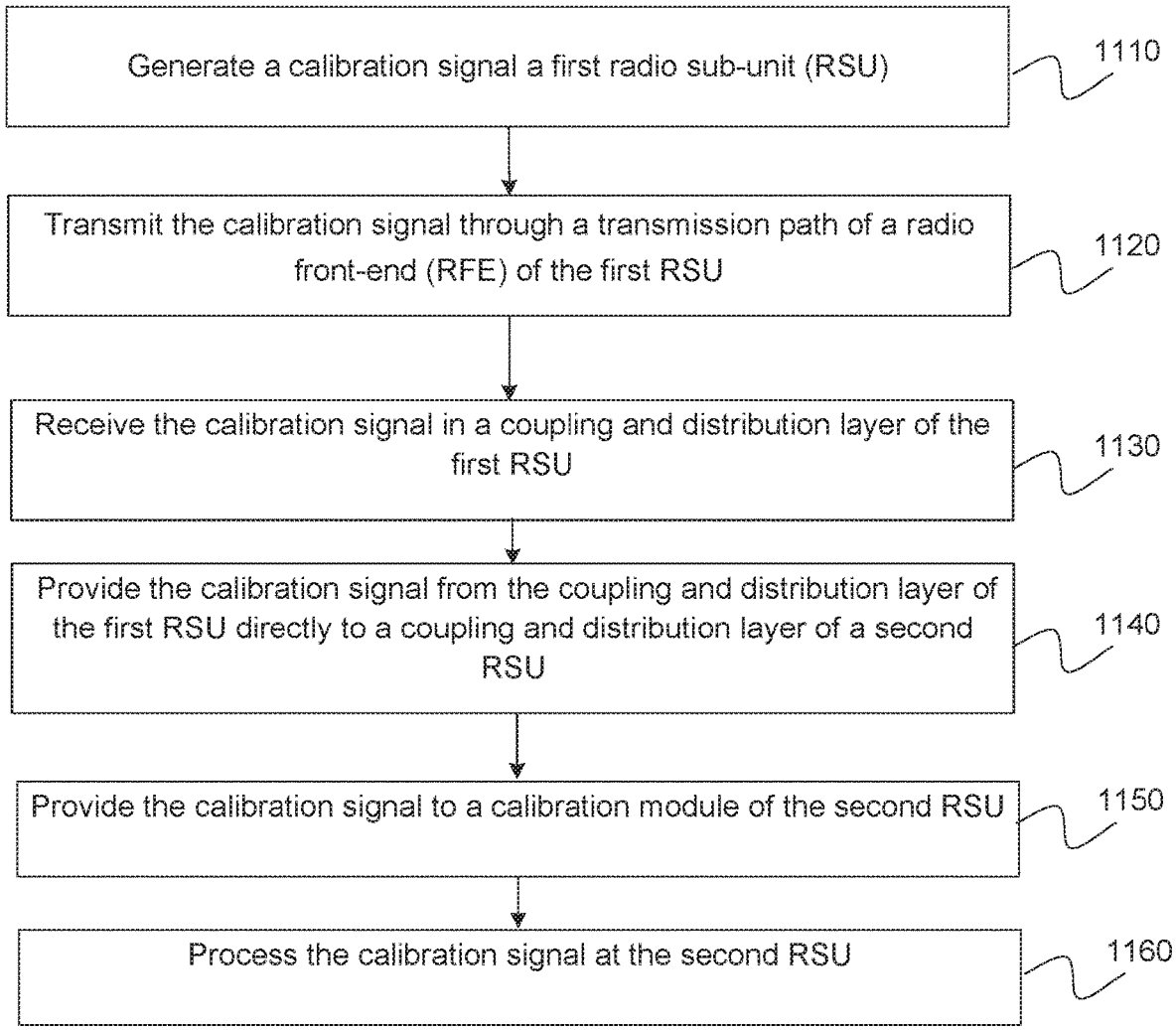
FIG. 11 is a flow diagram depicting a method of calibrating between different antenna ports in an antenna array, according to an example.

FIG. 11 is a flow diagram depicting a method 1100 of calibrating different antenna ports in an antenna array, according to an example. The method includes blocks 1110 through 1160. In alternate examples of the method, there may be greater, or fewer, blocks. The method 1100 begins at step 1110, where a calibration signal is generated at a first radio sub unit (RSU) of a radio unit. For example, the RSU may be RSUn of FIG. 9, and the calibration signal may be inter cal signal 901 generated in TRXn of RSUn. Or, for example, the RSU may be RSU1 of FIG. 10, and the calibration signal may be inter cal signal 904 generated in TRXcal of RSU1.

From block 1110 method 1100 proceeds to block 1120, where the calibration signal is transmitted through a transmission path of a radio front-end (RFE) of the first RSU. For example, also with reference to FIG. 9, the inter cal signal 901 is provided is provided to a coupler near antenna 238.

From block 1120 method 1100 proceeds to block 1130, where the calibration signal is received in a coupling and distribution layer of the first RSU, such as, for example, the coupling and distribution layer 401 of RSUn 650 in FIG. 9.

From block 1130 method 1100 proceeds to block 1140, where the calibration signal is directly transmitted from the coupling and distribution layer 401 of the first RSU to a coupling and distribution layer of a second RSU. For example, as shown in FIG. 9, the calibration signal 901 is directly transmitted from the coupling and distribution layer 401 of RSUn 650 to the coupling and distribution layer 401 of RSU1 610, through transition/connector 805 that is provided between the two RSUs, namely RSUn 650 and RSU1 610.

From block 1140 method 1100 proceeds to block 1150, where the calibration signal is provided to a calibration module 510 of the second RSU, such as, for example "Reference", the module including TRXcal 505 and the coupled RFEcal 510 of RSU1 610, in FIG. 9.

From block 1130 method 1100 proceeds to block 1160, where the calibration signal is processed at the second RSU, for example by TRXcal 505.

While the foregoing is directed to specific examples, other and further examples may be devised without departing from the basic scope thereof, and the scope thereof is determined by the claims that follow.

What is claimed is:

1. A method of calibrating signals, comprising:
generating a calibration signal at a first radio sub unit (RSU);
transmitting the calibration signal through a transmission path of a radio front end (RFE) of the first RSU;
receiving the calibration signal in a coupling and distribution layer of the first RSU, the coupling and distribution layer comprising at least one power combiner, and/or at least one power divider;
providing the calibration signal from the coupling and distribution layer of the first RSU directly to a coupling and distribution layer of a second RSU; and
processing the calibration signal on the second RSU.

2. The method of claim 1, further comprising providing the calibration signal to a calibration module of the second RSU for processing.

3. The method of claim 1, wherein the calibration signal from the coupling and distribution layer of the first RSU is provided to the coupling and distribution layer of the second RSU over a hardwired connector.

4. The method of claim 3, wherein the hardwired connector comprises a coaxial RF connector.

5. The method of claim 3, wherein a connection between the first RSU and the second RSU is short, and wherein the hardwired connector is an adapter or a board to board connector.

6. The method of claim 1, wherein the transmission path of the first RSU includes an antenna at its end.

7. The method of claim 6, wherein the calibration signal of the first RSU is sampled as close to the antenna as possible.

8. The method of claim 1, wherein the RSU includes an array of N antenna elements, and further comprising generating a set of N-1 additional calibration signals, so that there is a calibration signal associated with each of the N antenna elements.

9. The method of claim 8, wherein each of the N calibration signals is sampled as close to its respective antenna element as possible.

10. The method of claim 9, further comprising combining the N samples into a combined calibration signal, and providing the combined calibration signal to the coupling and distribution layer of the second RSU.

11. The method of claim 10, wherein processing the calibration signal in the second RSU includes measuring an amplitude and phase of each of the N samples.

12. A coupling and distribution apparatus, comprising:
an antenna array coupled to a first radio sub-unit (RSU), the array including N antenna ports;
one or more layers of power combiners, configured to combine the N antenna ports into a single combined port;
a single first power divider coupled to the single combined port, the first power divider configured to divide the single combined port into two output paths, a first signal path coupled to a reference receiver of the first RSU, and a second signal path coupled to a second RSU.

13. The apparatus of claim 12, wherein the second RSU is adjacent to the first RSU.

14. The apparatus of claim 12, wherein the second signal path includes a hardwired connector connected between the coupling and distribution apparatus of the first RSU and a coupling and distribution apparatus of the second RSU.

15. The apparatus of claim 14, wherein the hardwired connector comprises a coaxial RF connector.

16. The apparatus of claim 14, wherein a connection between the first RSU and the second RSU is short, and wherein the hardwired connector is an adapter or a board to board connector.

17. The apparatus of claim 14, wherein the hardwired connector is coupled to a radio front end (RFE) of a calibration module of the second RSU.

18. The apparatus of claim 17, wherein the hardwired connector is coupled to an RX path of the calibration module of the second RSU.

19. The apparatus of claim 12, further comprising an additional power combiner coupled to the first signal path and also to a signal path connected to a hardwired connector connected between the coupling and distribution apparatus and a coupling and distribution apparatus of a third RSU.

20. The apparatus of claim 19, wherein the additional power combiner is configured to combine a calibration signal path from the third RSU and the output of the first power divider into a single signal path to the reference receiver of the first RSU.

* * * * *